United States Patent
Hoffmann (10) Patent No.: US 10,536,330 B2
(45) Date of Patent: Jan. 14, 2020

(54) HIGHLY DYNAMIC AUTHORISATION OF CONCURRENT USAGE OF SEPARATED CONTROLLERS

(71) Applicant: NOKIA SOLUTIONS AND NETWORKS GMBH & CO. KG, Munich (DE)

(72) Inventor: Klaus Hoffmann, Munich (DE)

(73) Assignee: NOKIA SOLUTIONS AND NETWORKS GMBH & CO. KG, Munich (DE)

( * ) Notice: Subject to any disclaimer, the term of this patent is extended or adjusted under 35 U.S.C. 154(b) by 138 days.

(21) Appl. No.: 14/782,174

(22) PCT Filed: Apr. 3, 2013

(86) PCT No.: PCT/EP2013/057014
§ 371 (c)(1),
(2) Date: Oct. 2, 2015

(87) PCT Pub. No.: WO2014/161571
PCT Pub. Date: Oct. 9, 2014

(65) Prior Publication Data
US 2016/0072666 A1    Mar. 10, 2016

(51) Int. Cl.
*H04L 12/24*    (2006.01)
*H04L 12/46*    (2006.01)

(52) U.S. Cl.
CPC ...... *H04L 41/0803* (2013.01); *H04L 12/4641* (2013.01)

(58) Field of Classification Search
CPC ......... G06F 11/2038; G06F 2209/5014; G06F 9/5027; G06F 9/5044; G06F 9/5061;
(Continued)

(56) References Cited

U.S. PATENT DOCUMENTS 8,046,456 B1 *  10/2011  Miller ...................... H04L 41/12
                                                          709/224
8,320,388 B2 *  11/2012  Louati ................. H04L 41/0806
                                                          370/254

(Continued)

OTHER PUBLICATIONS

International Search Report and Written Opinion dated Jul. 5, 2013 corresponding to International Patent Application No. PCT/EP2013/057014.

(Continued)

*Primary Examiner* — Wutchung Chu
(74) *Attorney, Agent, or Firm* — Squire Patton Boggs (US) LLP (57) ABSTRACT

Methods and apparatuses are provided by which control in a virtual network is performed, in which resources of a network are modeled, wherein a network element is configured to be controlled by a first application control element, the method comprising establishing control information indicating at least one second application control element which is to be enabled to configure and/or control the network element, and sending the control information to a network control element. This network control element forwards the configuration information to a network element controller controlling the network element to accept configuration messages from the second application control element.

13 Claims, 4 Drawing Sheets

(58) Field of Classification Search
CPC .. G06F 9/5072; G06F 9/5077; G06F 9/45533; G06F 9/45558; G06F 9/455; G06F 11/2005; G06F 11/2007; G06F 11/0712; G06F 2009/45595; H04L 67/28; H04L 67/2809; H04L 41/0893; H04L 12/4641; H04L 49/70; H04L 45/586; H04L 41/0803; H04L 45/02; H04L 49/15; H04L 47/70; H04L 45/64; H04L 41/044; H04L 41/0896; H04L 47/782; H04L 41/12; H04L 41/0806; H04L 67/10; H04L 67/34; H04L 63/08; H04L 41/5054; H04L 63/10
USPC .................................................. 709/221, 226
See application file for complete search history.

(56) References Cited

U.S. PATENT DOCUMENTS

| | | | | |
|---|---|---|---|---|
| 9,009,217 B1* | 4/2015 | Nagargadde | G06F 17/5009 | 709/203 |
| 9,276,838 B2* | 3/2016 | Lee | H04L 45/64 | |
| 9,525,564 B2* | 12/2016 | Lee | H04L 12/4641 | |
| 9,537,730 B2* | 1/2017 | Kallin | H04L 41/5025 | |
| 9,654,335 B2* | 5/2017 | Axelrod | H04L 41/042 | |
| 9,674,111 B2* | 6/2017 | Hoffmann | H04L 12/4641 | |
| 2003/0135609 A1* | 7/2003 | Carlson | G06F 9/5011 | 709/224 |
| 2005/0090227 A1* | 4/2005 | Rao | H04L 12/14 | 455/405 |
| 2006/0059565 A1* | 3/2006 | Green | G06F 9/50 | 726/27 |
| 2012/0054347 A1* | 3/2012 | Lee | H04L 41/04 | 709/226 |
| 2012/0147898 A1 | 6/2012 | Koponen et al. | | |
| 2012/0155461 A1 | 6/2012 | Kim et al. | | |
| 2012/0233302 A1* | 9/2012 | Kallin | H04L 41/5025 | 709/221 |
| 2013/0132952 A1* | 5/2013 | Shah | G06F 9/45558 | 718/1 |
| 2013/0298244 A1* | 11/2013 | Kumar | G06F 21/52 | 726/25 |
| 2013/0329725 A1* | 12/2013 | Nakil | H04L 45/586 | 370/360 |
| 2013/0332577 A1* | 12/2013 | Nakil | H04L 41/0668 | 709/219 |
| 2014/0086177 A1* | 3/2014 | Adjakple | H04W 12/08 | 370/329 |
| 2014/0096183 A1* | 4/2014 | Jain | H04L 12/4641 | 726/1 |
| 2014/0098673 A1* | 4/2014 | Lee | H04L 45/64 | 370/238 |
| 2014/0129700 A1* | 5/2014 | Mehta | H04L 43/0817 | 709/224 |
| 2014/0317293 A1* | 10/2014 | Shatzkamer | G06F 9/455 | 709/226 |
| 2015/0100560 A1* | 4/2015 | Davie | H04L 45/16 | 707/703 |
| 2015/0111541 A1* | 4/2015 | Fiatal | H04M 3/4872 | 455/411 |
| 2016/0044035 A1* | 2/2016 | Huang | H04L 63/0272 | 726/4 |
| 2016/0105893 A1* | 4/2016 | Senarath | H04W 4/021 | 370/329 |
| 2016/0191345 A1* | 6/2016 | Despotovic | H04L 41/5006 | 709/226 |

OTHER PUBLICATIONS

A. Doria et al., "Forwarding and Control Element Separation (ForCES) Protocol Specification," Internet Engineering Task Force (IETF), RFC 5810, Mar. 2010, 124 pages.
T. Li et al., "IS-IS Extensions for Traffic Engineering," Network Working Group, IETF, RFC 5305, Oct. 2008, 17 pages.
J. Ash, "Path Computation Element (PCE) Communication Protocol Generic Requirements," Network Working Group, IETF, RFC 4657, Sep. 2006, 21 pages.
A. Farrel et al., "A Path Computation Element (PCE)-Based Architecture," Network Working Group, IETF, RFC 4655, Aug. 2006, 40 pages.
S. Yasukawa, "Signaling Requirements for Point-to-Multipoint Traffic-Engineered MPLS Label Switched Paths (LSPs)," Network Working Group, IETF, RFC 4461, Apr. 2006, 30 pages.
Open Flow Switch Specification, Version 1.1.0 Implemented (Wire Protocol 0x02); Feb. 28, 2011, 56 pages.
Roland Bless et al., "Network Virtualization from a Signaling Perspective," IEEE 2009, 6 pages.
Panagiotis Papadimitriou et al., "Implementing Network Virtualization for a Future Internet," Network Virtualization—Concept and Performance Aspects, 20th ITC Specialist Seminar, May 18-20, 2009, Hoi An, Vietnam, 8 pages.

* cited by examiner

Fig. 4 ns (GSM), the General Packet Radio System (GPRS), the Enhanced Data Rates for Global Evolutions (EDGE), or other wireless communication system, such as the Wireless Local Area Network (WLAN) or Worldwide Interoperability for Microwave Access (WiMAX), took place all over the world. Various organizations, such as the 3rd Generation Partnership Project (3GPP), Telecoms & Internet converged Services & Protocols for Advanced Networks (TISPAN), the International Telecommunication Union (ITU), 3rd Generation Partnership Project 2 (3GPP2), Internet Engineering Task Force (IETF), the IEEE (Institute of Electrical and Electronics Engineers), the WiMAX Forum and the like are working on standards for telecommunication network and access environments.

HIGHLY DYNAMIC AUTHORISATION OF CONCURRENT USAGE OF SEPARATED CONTROLLERS

FIELD OF THE INVENTION

The present invention relates to network virtualization, and is directed to a method, an apparatus and a computer program product which enable a highly dynamic authorisation of concurrent usage of separated controllers.

RELATED BACKGROUND ART

Prior art which is related to the technical field of network virtualization can e.g. be found in "Network Virtualization from a Signaling Perspective" by Roland Bless and Christoph Werle, Future-Net '09 International Workshop on the Network of the Future 2009 in conjunction with IEEE ICC 2009, Dresden, Jun. 16-18, 2009, "Implementing Network Virtualization for a Future Internet" by P. Papadimitriou, O. Maennel, A. Greenhalgh, A. Feldmann, and L. Mathy, 20th ITC Specialist Seminar on Network Virtualization, Hoi An, Vietnam, May 2008, as well as Request For Comments (RFC) Nos. 4461, 4655, 4657, 5305, 5810 issued by the IETF.

The following meanings for the abbreviations used in this specification apply:
CS—circuit switched
CS-IBCF—CS (domain) IBCF
CS-TrGW—CS (domain) TrGW
CSP—communication service provider
EPC—evolved packet core
Forces—forwarding and control element separation (IETF)
GLAB—German-LAB
IBCF—interconnection border control function
IMS—IP multimedia subsystem
IP—Internet protocol
NE—network element
PCE—path computation element
PCRF—policy control and charging rules function.
PIP/InP—physical infrastructure provider/infrastructure provider
QoS—quality of service
SASER—Save and Secure European routing
SIP—session initiation protocol
TrGW—transition gateway
VN—virtual network
VNO—virtual network operator
VNP—virtual network provider In the last years, an increasing extension of communication networks, e.g. of wire based communication networks, such as the Integrated Services Digital Network (ISDN), broadband networks, and especially the Internet and other packet based networks based e.g. on the Internet Protocol (IP), Ethernet, MPLS/GMPLS (Multiprotocol Label Switching/Generalized Multiprotocol Label Switching) or related technologies and preferably using optical transmission based on SDH/SONET (Synchronous Digital Hierarchy/Synchronous Optical Networking) and/or WDM/DWDM (Wavelength Division Multiplexing/Dense Wavelength Division Multiplexing), or wireless communication networks, such as the cdma2000 (code division multiple access) system, cellular 3rd generation (3G) communication networks like the Universal Mobile Telecommunications System (UMTS), enhanced communication networks based e.g. on LTE, cellular 2nd generation (2G) communication networks like the Global System for Mobile communica- Recent technology progress deals with network virtualization, which splits the conventional monolithically owned, used and operated networks into subsets to be used, operated and managed by different, organizationally independent control entities or organizations. Basically, network virtualization is a concept to create logical network resources, e.g. virtual nodes and virtual links, which form a virtual network, from physical resources.

The use of network virtualization promises additional flexibility and offers opportunities for deploying future network architectures. That is, network virtualization enables for the creation of logically isolated network partitions over a shared physical network infrastructure, wherein the network virtualization can be driven by the needs in, for example, an enterprise domain. Furthermore, network virtualization covers network elements and protocols that together maintain a coherent end-to-end view of a virtual network.

Basically, network virtualization is considered in 3 main sections:
- Network elements: how is traffic separation and isolation of different virtual networks maintained internal to a network element for the data part and the control part;
- Data path: how is traffic separation enforced across a network path;
- Control plane: what extensions to protocols are needed to control and manage partitioned resources (access to NEs and between NEs).

Considerations regarding network virtualization are made, for example, in connection with several projects, for example 4WARD (European-Union funded) and G-Lab (German national funded). Results of such projects introduced, for example, a separation into different roles regarding network virtualization, i.e. a Virtual Network Operator, VNO, role or level, a Virtual Network Provider, VNP, role or level, and a Physical Infrastructure Provider or just Infrastructure Provider, PIP/InP, role or level.

PIP/InP are infrastructure providers, e.g. large companies that own the infrastructure required to enable communication between different locations and which provide end users with access to their networks. Infrastructure providers may also enable the creation of virtual nodes and virtual links on top of and using their own physical resources and provide them to another party.

VNP is a provider which represents an intermediate party between a VNO and the infrastructure providers. The VNP is capable and equipped, for example, to compose and provide a virtual network slice as requested by a VNO from physical resources of one or more infrastructure providers. The VNO, on the other hand, can install and instantiate a network architecture using the virtual network slice and properly configure it. After the virtual network has been set up, end users may attach to it and use the service it provides.

A VNO may provide a service in the virtual network by itself or allow other service providers to offer their services, e.g., an IP-TV service, inside the virtual network.

That is, the VNP is supposed to request and collect virtual resources from a PIP/InP, and to form a whole virtualized network on behalf of a VNO, which in turn operates this virtual network. In that way, the physical resources of a PIP/InP are separated and transformed into virtual resources provided to and managed by a VNP, and configured to form virtual networks finally handed over to VNOs for operation and use. In that way also the control of such virtual resources, even if implemented as shares of the same physical entities, is completely handed over to the virtual network operator using it.

Thus, with the event of network and IT virtualization, existing architectures are challenged. As such the Hypervisors are known, also Flowvisor is known, see OpenFlow (e.g., https://www.opennetworking.org/) etc. New architectures require new interfaces and/or procedures to support existing/expected services.

For example, elements such as CS-IBF and CS-TrGW will probably be disruptively replaced in the future. In connection with this example, it may happen that the Controller of the TrgGW which might be the PCRF or the SPDF may wish to manipulate the "dataplane" via an intermediate OpenFlow FlowVisor additionally to the normal VNO control plane instance.

However up to now it is not possible dynamically assign another Controller to the Flowvisor.

In this connection, it is referred to document "FlowVisor: A Network Virtualization Layer" by Rob Sherwood, Glen Gibb, Kok-Kiong Yap, Guido Appenzeller, Martin Casado, Nick McKeown and Guru Parulkar, Oct. 14, 2009 (http://OpenFlowSwitch.org/downloads/technicalreports/openflow-tr-2009-1-flowvisor.pdf), and also to RFC3476 and RFC5810.

In particular, an example is considered in which an IMS/EPC software is running in the virtual network environment. An overview over an example is illustrated in FIG. 4.

Figure 4:
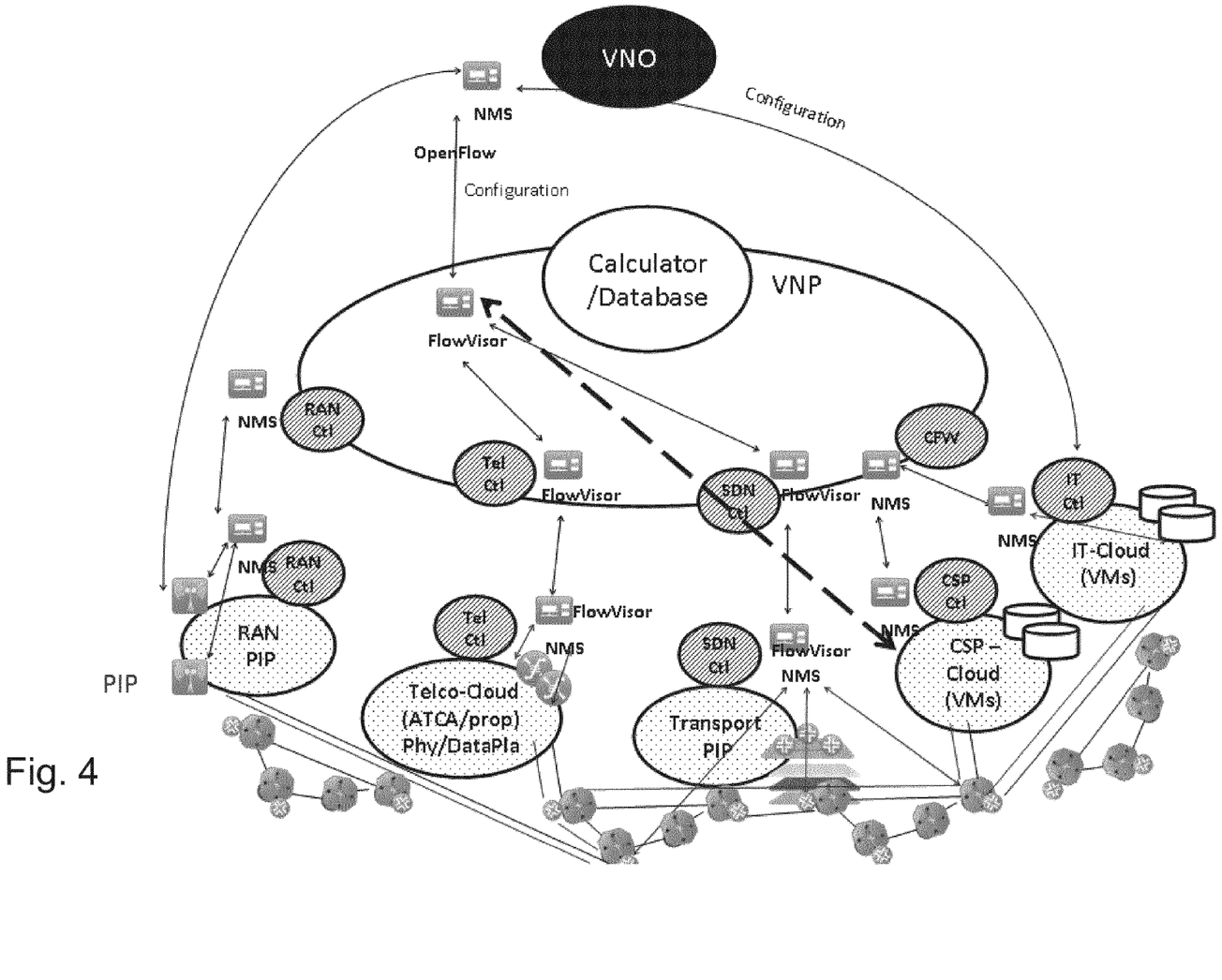
FIG. 4 illustrates an example for a virtual network.

In FIG. 4, the virtual network consists a) of the transport PIP/network offering router and switches delivering connectivity to the virtual machines and b) the Telco/ATCA platforms preferably providing the user plane of the separated SGW and PGW, and c) the cloud (may it be the Communication Service Provider (CSP) Cloud (server Farm etc) or an IT Cloud (e.g. a service provider cloud) hosting the control plane of the separated SGW and PGW.

In such a case, it may be possible that the IMS/EPC control plane software running in the cloud may need to manipulate the data forwarding elements for the individual IMS session (like for instance a CS-IBCF, a P-CSCF or an IBCF which needs to control the SPDF and the BGW) above the normal transport level as being configured by the VNO controller via the corresponding FlowVisors.

Such a case is indicated in FIG. 4 by a dashed arrow which connects the CSP Cloud (e.g. assumed to contain some IMS control functionality like the CS-IBCF, IBCF, or P-CSCF like and/or etc) with the Flowvisor of the VNP. That is, this indicates that preferably it should be possible that a second controller can by assigned.

However, per definition for both OpenFlow and Forces any controlling element needs to have a secure channel allowing only preconfigured controllers to control the forwarding element. For example, this is specified in "OpenFlow Switch Specification", Version 1.1.0 Implemented (Wire Protocol 0x02), Feb. 28, 2011 (http://vvww.openflow.org/documents/openflow-spec-v1.1.0.pdf). According to chapter 5.2 thereof, the OpenFlow Switch must establish the connection to the controller, the same is true for the FlowVisor and its controller. Within Forces again the NEs needed to be preconfigured in order to be able to establish an authorized relationship.

However, in the highly dynamic virtualized environment where the participants of the ecosystem can dynamically assign resources and in particular do not want to share the internals of their networks or it is not possible to share all Openflow or Forces interfaces/addresses with each other (e.g., between PIPs and VNOs) due to scalability reasons.

Therefore, it is desirable to provide a dynamic procedure without the need to reveal network internals to the others more than needed.

SUMMARY OF THE INVENTION

Embodiments of the present invention address this situation and aim to overcome the above-described problem and to provide a method, apparatus, and computer program product by means of which it is enabled to dynamically assign another controller to control a physical network element.

According to a first aspect of the present invention a method for performing control in a virtual network, in which resources of a network are modeled, is provided wherein a network element is configured to be controlled by a first application control element, the method comprising
    establishing control information indicating at least one second application control element which is to be enabled to configure and/or control the network element, and
    sending the control information to a network control element.

According to a second aspect of the present invention a method for performing control in a virtual network, in which resources of a network are modeled, is provided, wherein a network element is configured to be controlled by a first application control element, the method comprising
    receiving control information indicating a second application control element which is to be enabled to configure and/or control the network element, and
    forwarding configuration information to a network element controller controlling the network element to accept configuration messages from the second application control element.

According to a third aspect of the present invention, a method is provided for operating a network element which is controlled by a virtual network, in which resources of a physical network are modeled, wherein the network element is configured to be controlled by a first application control element, the method comprising
    receiving configuration information indicating a second application control element which is to be enabled to configure and/or control the network element, and
    accepting configuration and/or control from the second network control element based on the configuration information.

According to a fourth aspect of the present invention, an apparatus is provided which comprises a memory, at least one input/output unit, and a processor configured to perform control in a virtual network, in which resources of a network are modeled, to control a network element, to establish control information indicating at least one further application control element which is to be enabled to configure and/or control the network element, and to send the control information to a network control element via the at least one input/output unit.

According to a fifth aspect of the present invention, an apparatus is provided which comprises a memory, at least one input/output unit, and a processor configured to perform control in a virtual network, in which resources of a network are modeled, wherein a network element is configured to be controlled by a first application control element, wherein the processor is further configured to receive, via the at least one input/output unit, control information indicating a second application control element which is to be enabled to configure and/or control the network element, and to forward configuration information to a network element controller controlling the network element to accept configuration messages from the second application control element.

According to a sixth aspect of the present invention, an apparatus is provided which comprises a memory, at least one input/output unit, and a processor configured to operate a network element which is controlled by a virtual network, in which resources of a network are modeled, wherein the network element is configured to be controlled by a first application control element, wherein the processor is further configured to receive, via the at least one input/output unit, configuration information indicating a second application control element which is to be enabled to configure and/or control the network element, and to accept configuration and/or control from the second application control element.

According to a seventh aspect of the present invention, a computer program product is provided which comprises code means for performing a method according to any one of the first to third aspects of the present invention and their modifications when run on a processing means or module. The computer program product may be embodied on a computer-readable medium.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

In the following, the problem underlying the present invention and the solution thereto is described.

As mentioned above in connection with FIG. 4, in the highly dynamic virtualized environment where the participants of the ecosystem can dynamically assign resources and in particular do not want to share the internals of their networks or it is not possible to share all Openflow or Forces interfaces/addresses with each other (e.g., between PIPs and VNOs) due to scalability reasons.

Therefore according to embodiments of the present invention, a dynamic procedure without the need to reveal network internals to the others more than needed is provided, as described in the following.

As with normal VNO instantiation the VNO gets access to the resources (see PCT/EP2010/066534 (WO2012055446)), via the VNP and the PIP where there are corresponding FlowVisors (or similar entities) for the configuration. However, additionally the EPC session and the IMS session within the virtual network need to have access to e.g. the GTP tunnel and the SIP layer (BGW) etc in addition and/or in parallel to the existing interface.

Therefore, according to the present embodiment, the Forces and the OpenFlow interface is enhanced such that the VNO controller (which of course knows its own virtualised IMS/EPC software instances), announces those instances of the IMS/EPC to the FlowVisor of the VNP within one of the existing OpenFlow/Forces messages (or new invented message) in a new information element, such that the corresponding FlowVisor/OpenFlow Switch dynamically accepts configuration message from those entities as well.

Instead of announcing the instances, preferably the VNO controller may announce the addresses of the corresponding instances of the IMS/EPC to the FlowVisor of the VNP within one of the existing OpenFlow/Forces messages (or new message) in the new information element.

In this way, it is possible that an additional controller is enabled to control/configure a physical network element such as a switch, which is already controlled by another controller.

Figure 1:
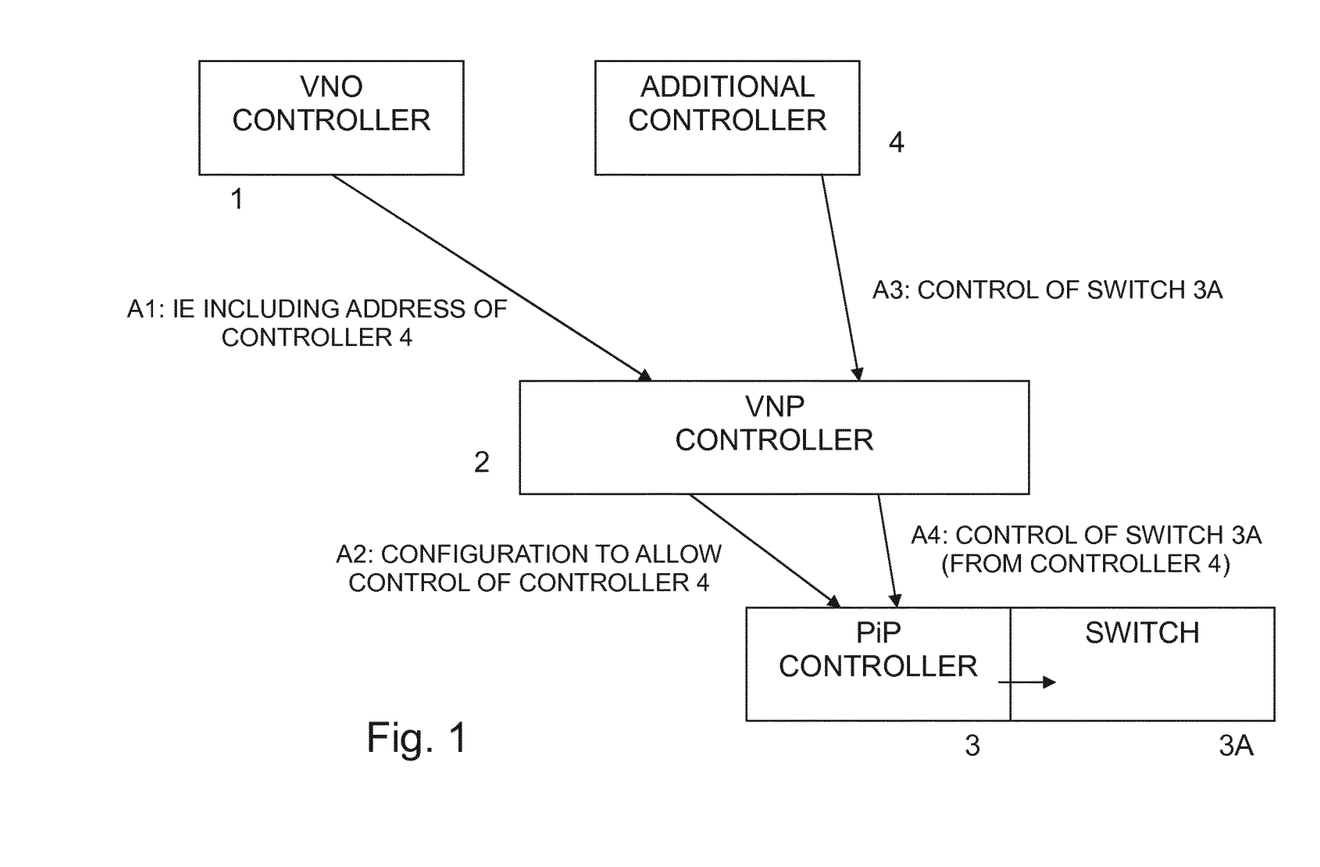
FIG. 1 illustrateds a procedure for enabling control of a switch by an additional controller according to an embodiment of the present invention.

This is also illustrated in FIG. 1, in which the VNO controller (a control element on the VNO level) is denoted by reference sign 1, the VNP controller (a control element on the VNP level) is denoted by reference sign 2, the PiP controller (a control element on the PiP (or InP) level, i.e., the controller of the switch 3A as an example for the physical network element in the physical network) is denoted by reference sign 3, and the additional controller (e.g., the above-mentioned IMS/EPC instance) is denoted by reference sign 4. In A1, the VNO controller 1 sends an information element (IE) in an OpenFlow/Forces message (as an example for a virtual network control message) to the VNP controller 2. This IE includes the address of the additional controller 4, or another indication of the identity of the additional controller 4. In A2, the VNP controller configures the PiP controller 3 to allow control of the switch 3A by the additional controller 4.

Figure 2:
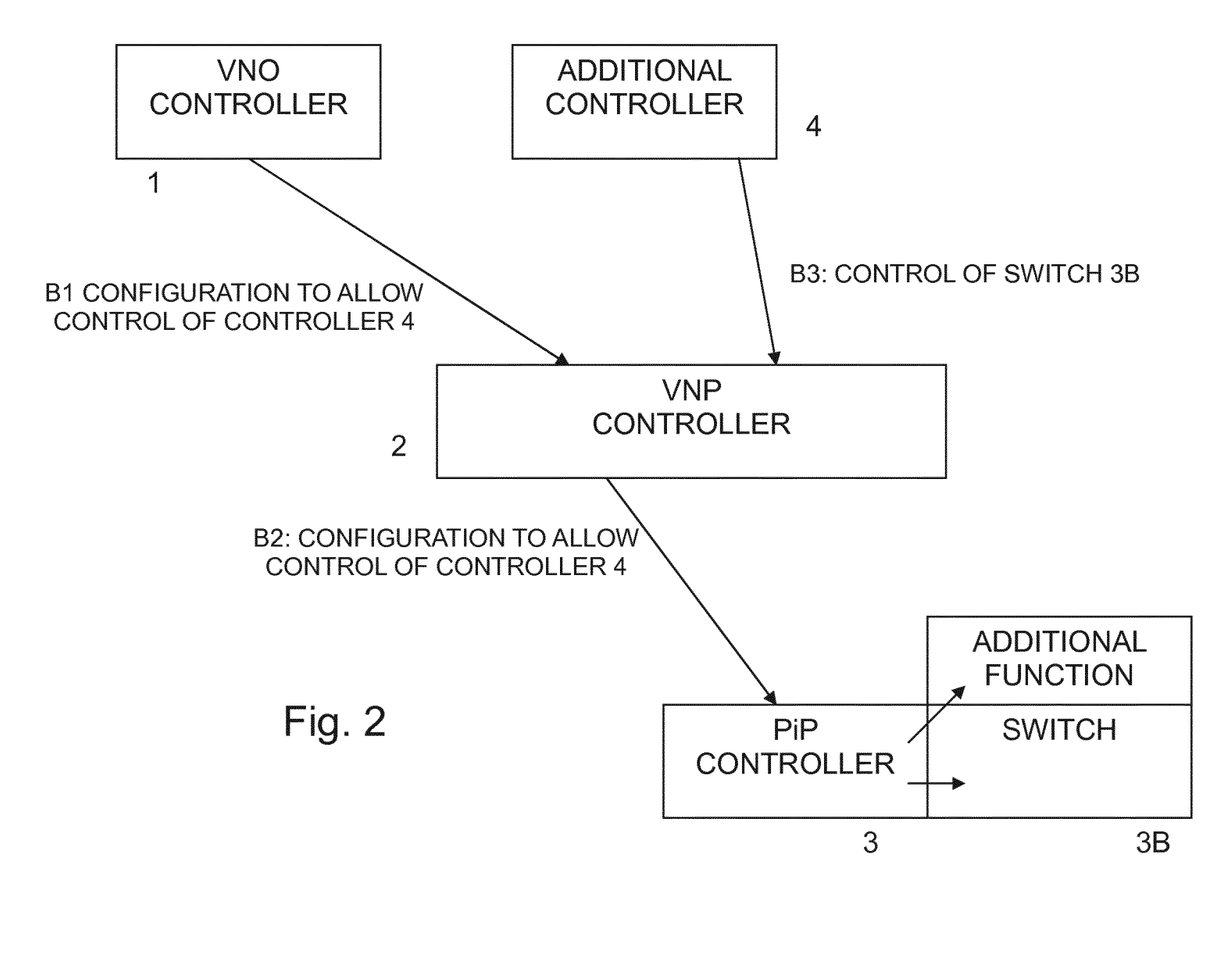
FIG. 2 illustrates an alternative procedure for enabling control of a switch by an additional controller according to an embodiment of the present invention.

Another embodiment is described in the following by referring to FIG. 2, which is similar to that shown in FIG. 1 with the following exception. Namely, according to FIG. 2, the VNP controller may hide the presence of the second controller 4 from the PiP controller. This may be done by encapsulating the control signaling of the additional controller 4 into control signaling which is supplied from the VNP controller 2 to the PiP controller. The switch 3B according to FIG. 2 has an additional function, which may then be controlled by the control signaling of the additional controller 4. B1 and B2 are similar to A1 and A2 of FIG. 1, however, the control of the switch 3B in B3 by the additional controller 4 is now performed such that the control signaling (information) is piggybacked (encapsulated) on control signaling of the VNO controller 1. Thus, a higher layer Flowvisor may receive from its higher layers to interfaces and may piggyback or combine them into on single interface to its lower level/partner role.

Hence, the additional controller is enabled to perform control/configuration etc. of the switch 3A (via VNP), as indicated in A3 and A4, or of the switch 3B via the encapsulated signaling.

The authorization as given by the VNO controller to accept configuration/control from the additional controller may also be removed again. This can be effected by the VNO controller by sending a corresponding IE within an Open-Flow/Forces message to the VNP controller 2, similar as described above in A1.

Hence, as mentioned above, the Forces/OpenFlow protocol is to be changed accordingly (wherein other interfaces are not excluded) such that the lower level entity (e.g., the switch 3A and/or the controller 1 may advise the VNP controller 2 to accept the controller 4, in case the VNP controller is going to hide the controller 4 from the PIP controller/switch) accepts new controllers as advised by the current (and already authorized) controller. The VNO may add or remove virtualized SGW control software, PGW control software, PCRF, SPDF as needed, however the interface addresses as being allocated by the cloud and the transport provider are not known in advance and therefore are distributed by the VNO to the VNP, so that the VNP also accepts configuration commands from the cloud hosting the SGW control software, PGW control software, PCRF, SPDF.

Figure 3:
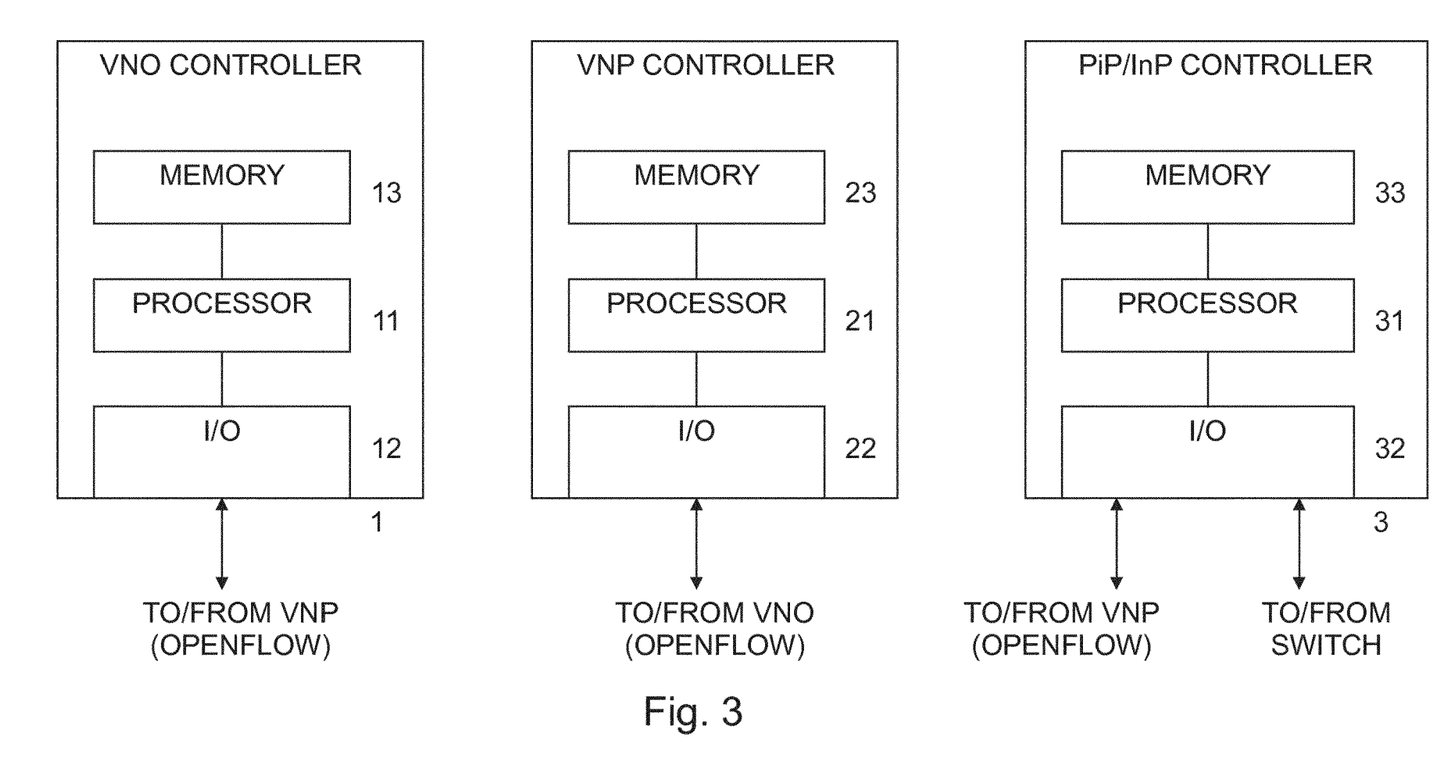
FIG. 3 shows block circuit diagrams illustrating configurations of control elements in which examples of embodiments of the invention are implementable.

In the following, a general embodiment of the present invention is described by referring to FIG. 3. In particular, FIG. 3 shows several control elements involved in procedures according to embodiments of the present invention. In more detail, FIG. 3 shows the VNO controller 1 (as an example for a first application control element), the VNP controller 2 (as an example for the network control element), and the PiP controller 3 (as an example for a network element controller).

It is to be noted that the controllers 1 to 3 shown in FIG. 3 may comprise several further elements or functions besides those described in connection therewith but which are omitted herein for the sake of simplicity as they are not essential for understanding the invention.

As shown in FIG. 3, the VNO controller 1 (as an example for the first application control element) comprises a processing function or processor 11, such as a CPU or the like, which executes instructions given by programs or the like related to the reliability and availability setting control. The processor 11 may comprise further portions dedicated to specific processings as described below. Portions for executing such specific processings may be also provided as discrete elements or within one or more further processors, for example. Reference sign 12 denotes transceivers or input/output (I/O) units connected to the processor 11. The I/O units 12 may be used for communicating with other network elements or functions, such as other hierarchical levels like the PIP/InP level or the VNP level. Reference sign 13 denotes a memory usable, for example, for storing data and programs to be executed by the processor 11 and/or as a working storage of the processor 11.

The processor 11 is configured to perform control in a virtual network, in which resources of a (physical/virtual) network are modeled, to control a network element, to establish control information indicating at least one further application control element (e.g., the additional controller 4) which is to be enabled to configure and/or control the network element, and to send, via the at least one input/output unit, the control information to a network control element via the at least one input/output unit 12.

Similar as the VNO controller 1, the VNP controller 2 (as an example for the network control element) comprises a processing function or processor 21, such as a CPU or the like, which executes instructions given by programs or the like related to the reliability and availability setting control. The processor 21 may comprise further portions dedicated to specific processings as described below. Portions for executing such specific processings may be also provided as discrete elements or within one or more further processors, for example. Reference sign 22 denotes transceivers or input/output (I/O) units connected to the processor 21. The I/O units 22 may be used for communicating with other network elements or functions, such as other hierarchical levels like the PIP/In P level or the VNO level. Reference sign 23 denotes a memory usable, for example, for storing data and programs to be executed by the processor 21 and/or as a working storage of the processor 21.

The processor 21 is configured to perform control in a virtual network, in which resources of a (physical/virtual) network are modeled, wherein a network element is configured to be controlled by a first application control element, wherein the processor 21 is further configured to receive, via the at least one input/output unit 22, control information indicating a second application control element which is to be enabled to configure and/or control the network element, and to forward configuration information to a network element controller controlling the network element to accept configuration messages from the second application control element.

Furthermore, the PiP controller 3 (as an example for a network element controller) comprises a processing function or processor 31, such as a CPU or the like, which executes instructions given by programs or the like related to the reliability and availability setting control. The processor 31 may comprise further portions dedicated to specific processings as described below. Portions for executing such specific processings may be also provided as discrete elements or within one or more further processors, for example. Reference sign 32 denotes transceivers or input/output (I/O) units connected to the processor 31. The I/O units 32 may be used for communicating with other network elements (e.g., the switch 3A mentioned above) or functions, such as other hierarchical levels like the VNP level. Reference sign 33 denotes a memory usable, for example, for storing data and programs to be executed by the processor 31 and/or as a working storage of the processor 31.

The processor 31 is configured to operate a network element which is controlled by a virtual network, in which resources of a physical/virtual network are modeled, wherein the network element is configured to be controlled by a first application control element, wherein the processor 31 is further configured to receive, via the at least one input/output unit 32, configuration information indicating a second application control element which is to be enabled to configure and/or control the network element, and to accept configuration and/or control from the second application control element.

It is noted that the embodiments and the present invention in general is not limited to the specific examples given above.

In the above embodiments, a physical network element such as the TrGW was described as the network element, which is to be controlled by a second controller (such as the IBCF). However, the present invention is not limited to this. For example, the same procedure could be applied for controlling a virtual network element by a second controller. For example, a higher layer VNP may request virtual resources from a lower level VNP and only the lowest level VNP does request virtual resources from the physical network. The VNP may not know. That is, the network element, the first network control element (i.e., the controller normally controlling the network element) and the second network control element (to be dynamically assigned to the network element) can each be on any level in the virtual network, and may also be all on the same level.

Hence, the network element may be a physical network element in a physical network or a virtual network element in a virtual network. The network, the resources of which are modeled, may be a physical network or a virtual network, wherein the virtual network may be different from that virtual network in which control is carried out by the above-described control elements.

Moreover, in embodiments described above, it was described that the VNP controller 2 trusts the additional controller 4 because the corresponding information is received from the VNO controller 1, which is trusted by the VNP controller 2. However, the invention is not limited to this. For example, the VNP controller 2 (the network control element) can decide to trust the additional controller 4 (the second application control element) based on network configuration. For example, a list of trusted application control elements could be predefined in the network configuration.

Hence, according to some embodiments of the present invention, methods and apparatuses are provided by which control in a virtual network is performed, in which resources of a network are modeled, wherein a network element is configured to be controlled by a first application control element, the method comprising establishing control information indicating at least one second application control element which is to be enabled to configure and/or control the network element, and sending the control information to a network control element. This network control element forwards the configuration information to a network element controller controlling the network element to accept configuration messages from the second application control element.

According to another aspect of embodiments of the present invention, an apparatus is provided which comprises
  means for performing control in a virtual network, in which resources of a network are modeled,
  means for controlling a network element,
  means for establishing control information indicating at least one further application control element which is to be enabled to configure and/or control the network element, and
  means for sending the control information to a network control element.

According to a further aspect of embodiments of the present invention, an apparatus is provided which comprises
  means for performing control in a virtual network, in which resources of a network are modeled, wherein a network element is configured to be controlled by a first application control element,
  means for receiving, via the at least one input/output unit, control information indicating a second application control element which is to be enabled to configure and/or control the network element, and
  means for forwarding configuration information to a network element controller controlling the network element to accept configuration messages from the second application control element.

According to a still further aspect of embodiments of the present invention, an apparatus is provided which comprises
  means for operating a network element which is controlled by a virtual network, in which resources of a network are modeled, wherein the network element is configured to be controlled by a first application control element,
  means for receiving configuration information indicating a second application control element which is to be enabled to configure and/or control the network element, and
  means for accepting configuration and/or control from the second application control element.

It is to be understood that any of the above modifications can be applied singly or in combination to the respective aspects and/or embodiments to which they refer, unless they are explicitly stated as excluding alternatives.

For the purpose of the present invention as described herein above, it should be noted that
  an access technology via which signaling is transferred to and from a network element may be any technology by means of which a network element or sensor node can access another network element or node (e.g. via a base station or generally an access node). Any present or future technology, such as WLAN (Wireless Local Access Network), WiMAX (Worldwide Interoperability for Microwave Access), LTE, LTE-A, Bluetooth, Infrared, and the like may be used; although the above technologies are mostly wireless access technologies, e.g. in different radio spectra, access technology in the sense of the present invention implies also wired technologies, e.g. IP based access technologies like cable networks or fixed lines but also circuit switched access technologies; access technologies may be distinguishable in at least two categories or access domains such as packet switched and circuit switched, but the existence of more than two access domains does not impede the invention being applied thereto,
  usable communication networks, stations and transmission nodes may be or comprise any device, apparatus, unit or means by which a station, entity or other user equipment may connect to and/or utilize services offered by the access network; such services include, among others, data and/or (audio-) visual communication, data download etc.;
  a user equipment or communication network element (station) may be any device, apparatus, unit or means by which a system user or subscriber may experience services from an access network, such as a mobile phone or smart phone, a personal digital assistant PDA, or computer, or a device having a corresponding functionality, such as a modem chipset, a chip, a module etc., which can also be part of a UE or attached as a separate element to a UE, or the like;
  method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;
  generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, eNode-B etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

The invention claimed is:

1. A method for controlling a virtual network in which resources of a physical network or a further virtual network are modeled, wherein a network element of the physical network or the further virtual network is configured to be controlled by a virtual network operator controller the method comprising:
receiving, in a virtual network control message from the virtual network operator controller, control information indicating at least one additional controller, which is not configured to be enabled to control the network element, to be enabled and disabled to control the network element;
forwarding configuration information to a network element controller controlling the network element to accept configuration messages from the additional controller; and
receiving, in the virtual network control message from the virtual network operator controller, via at least one input/output unit, control information indicating that the at least one additional controller is no longer to be enabled to control the network element and forwarding configuration information to the network element controller controlling the network element to not accept configuration messages from the additional controller.

2. The method according to claim 1, wherein the control information comprises information of an identity of the at least one additional controller and/or information of an address of the at least one additional controller.

3. The method according to claim 1, further comprising:
deciding whether the at least one additional controller is to be trusted or not; and
forwarding the configuration information to the network element controller controlling the network element only when the additional controller can be trusted.

4. The method according to claim 3, wherein it is decided to trust the additional controller when the control information is received from a trusted application control element and/or it is decided to trust the additional controller based on network configuration.

5. The method according to claim 1, further comprising:
receiving, in the virtual network control message, control information indicating that the at least one additional controller is no longer to be enabled to configure and/or control the network element or
deciding that the additional controller is no longer to be enabled to configure and/or control the network element; and
forwarding configuration information to the network element controller controlling the network element to not accept configuration messages from the additional controller.

6. The method according to claim 1, wherein the control information is inserted into an information element of the virtual network control message.

7. A computer program product embodied on a non-transitory computer-readable medium, said product comprising computer-executable components which, when the program is run on a processing device, are configured to carry out the method according to claim 1.

8. A virtual network provider controller comprising
a memory,
at least one input/output unit, and
a processor, the virtual network provider controller being a control element on a virtual network provider level of a virtual network in which resources of a physical network or a further virtual network are modeled and wherein a network element of the physical network or the further virtual network is configured to be controlled by a virtual network operator controller,
the processor being further configured to
to receive, in a virtual network control message from the virtual network operator controller, via the at least one input/output unit, control information indicating an additional controller, which is not configured to be enabled to control the network element, to be enabled to control the network element;
to forward configuration information to a network element controller controlling the network element to accept configuration messages from the additional controller; and
to receive, in the virtual network control message from the virtual network operator controller, via the at least one input/output unit, control information indicating that the at least one additional controller is no longer to be enabled to control the network element and to forward configuration information to the network element controller controlling the network element to not accept configuration messages from the additional controller.

9. The apparatus according to claim 8, wherein the control information comprises information of an identity of the at least one additional controller and/or information of an address of the at least one additional controller.

10. The apparatus according to claim 8, wherein the processor is further configured to decide whether the at least one additional controller is to be trusted or not; and
to forward the configuration information to the network element controller controlling the network element only when the additional controller can be trusted.

11. The apparatus according to claim 10, wherein the processor is configured to decide to trust the additional controller when the control information is received from a trusted application control element and/or to decide to trust the additional controller based on network configuration.

12. The apparatus according to claim 8, wherein the processor is further configured
to receive, in the virtual network control message, via the at least one input/output unit, control information indicating that the at least one additional controller is no longer to be enabled to configure and/or control the network element; or
to decide that the additional controller is no longer to be enabled to configure and/or control the network element, and
to forward configuration information to the network element controller controlling the network element to not accept configuration messages from the additional controller.

13. The apparatus according to claim 8, wherein the control information is inserted into an information element of the virtual network control message.

* * * * *